(12) United States Patent
Pearlstein et al.

(10) Patent No.: US 6,385,248 B1
(45) Date of Patent: May 7, 2002

(54) METHODS AND APPARATUS FOR PROCESSING LUMINANCE AND CHROMINANCE IMAGE DATA

(75) Inventors: Larry Pearlstein, Newton, PA (US); Sharif M. Sazzad, Monmouth Junction, NJ (US)

(73) Assignee: Hitachi America Ltd.

( * ) Notice: Subject to any disclaimer, the term of this patent is extended or adjusted under 35 U.S.C. 154(b) by 0 days.

(21) Appl. No.: 09/105,224

(22) Filed: Jun. 26, 1998

Related U.S. Application Data

(63) Continuation-in-part of application No. 09/076,448, filed on May 12, 1998, now Pat. No. 6,122,321.

(51) Int. Cl.[7] .............................................. H04N 7/12
(52) U.S. Cl. ........................ 375/240.25; 375/240.21; 375/240.29
(58) Field of Search ..................... 375/240.12, 240.21, 375/240.25, 240.29, 240.02; 348/444, 450–453, 493, 557, 560, 568, 630–631, 642, 727–728, 405.1, 416.1, 419.1; 382/233, 236, 238, 239

(56) References Cited

U.S. PATENT DOCUMENTS

| | | | |
|---|---|---|---|
| 3,934,268 A | 1/1976 | Uemura | 360/101 |
| 4,031,548 A | 6/1977 | Kato et al. | 358/188 |

(List continued on next page.)

FOREIGN PATENT DOCUMENTS

| | | |
|---|---|---|
| DE | 197 09 391 A1 | 10/1997 |
| EP | 0 367 264 | 5/1990 |
| EP | 0 469 842 | 2/1992 |
| EP | 0 505 985 | 9/1992 |
| EP | 0 509 594 | 10/1992 |
| EP | 0 707 426 A3 | 4/1996 |
| EP | 0 707 426 A2 | 4/1996 |
| WO | WO 91/02430 | 2/1991 |

OTHER PUBLICATIONS

Dubois et al., "Multiplexing of luminance and chrominance in NTSC compatible extended definition systems based on subsampling", IEEE Inter. Symp. on Cir. and Sys., vol. 2, pp. 1290–1293, May 1990.*

(List continued on next page.)

Primary Examiner—Vu Le
(74) Attorney, Agent, or Firm—Straub & Pokotylo; Michael P. Straub

(57) ABSTRACT

Methods and apparatus for implementing video decoders at a reduced cost are described. The methods include data reduction techniques, simplified inverse quantization techniques, and dynamically varying the complexity of image enhancement operations, e.g., prediction filtering operations, as a function of whether luminance or chrominance data is being processed. In order to reduce data storage requirements, luminance and chrominance data corresponding to previously encoded images may be stored at different resolutions with, in some embodiments, chrominance data being stored at less than half the resolution of luminance data. In various embodiments, data representing portions of B frames which will not be displayed is identified and discarded, e.g., without performing a decoding operation thereon. Portions of I and P frames which will not be displayed are identified and decoded at a reduced resolution and/or using simplified inverse quantization techniques. The decoded I and P frame data is stored for use when making subsequent predictions if required. Another data reduction technique involves applying different amounts of data reduction, e.g., downsampling, to different image portions with no or little downsampling being performed on image portions located at or nearest to the image's center of interest as determined from information included in a received encoded bitstream.

37 Claims, 5 Drawing Sheets

U.S. PATENT DOCUMENTS

| | | | | |
|---|---|---|---|---|
| 4,139,867 A | 2/1979 | Foerster | | 360/10 |
| 4,193,098 A | 3/1980 | Bixby et al. | | 360/10 |
| 4,238,773 A | 12/1980 | Tsuboka et al. | | 358/183 |
| 4,263,623 A | 4/1981 | Woo et al. | | 360/10 |
| 4,290,087 A | 9/1981 | Bixby et al. | | 360/33 |
| 4,339,775 A | 7/1982 | Lemke et al. | | 360/10 |
| 4,355,324 A | 10/1982 | Reitmeier | | 358/312 |
| 4,504,869 A | 3/1985 | Warren | | 358/312 |
| 4,510,538 A | 4/1985 | Sato et al. | | 360/84 |
| 4,541,012 A | * 9/1985 | Tescher | | 348/400 |
| 4,541,020 A | 9/1985 | Kimura | | 360/22 |
| 4,558,376 A | 12/1985 | Heitmann | | 360/10.1 |
| 4,584,613 A | 4/1986 | Amari et al. | | 358/310 |
| 4,636,874 A | 1/1987 | Hoogendoorn et al. | | 360/10.2 |
| 4,636,879 A | 1/1987 | Narita et al. | | 360/72.2 |
| 4,668,998 A | 5/1987 | Aoki | | 360/10.3 |
| 4,716,453 A | * 12/1987 | Pawelski | | 348/396 |
| 4,783,707 A | 11/1988 | Nemoto et al. | | 360/105 |
| 4,807,053 A | 2/1989 | Heijnemans | | 358/335 |
| 4,825,301 A | 4/1989 | Pape et al. | | 358/335 |
| 4,887,169 A | 12/1989 | Bannai et al. | | 358/335 |
| 4,910,605 A | 3/1990 | Sasaki et al. | | 358/310 |
| 4,931,879 A | 6/1990 | Koga et al. | | 358/335 |
| 4,985,781 A | 1/1991 | Hirasawa | | 358/324 |
| 5,023,710 A | 6/1991 | Kondo et al. | | 358/133 |
| 5,027,235 A | 6/1991 | Furuyama | | 360/77.16 |
| 5,047,869 A | 9/1991 | Aoki et al. | | 358/341 |
| 5,050,014 A | 9/1991 | Maeda et al. | | 360/75 |
| 5,091,785 A | 2/1992 | Canfield et al. | | 358/183 |
| 5,097,363 A | 3/1992 | Takei et al. | | 360/10.3 |
| 5,119,208 A | 6/1992 | Fujimoto | | 358/310 |
| 5,126,852 A | 6/1992 | Nishino et al. | | 358/335 |
| 5,132,807 A | 7/1992 | Takimoto et al. | | 358/335 |
| 5,134,464 A | 7/1992 | Basile et al. | | 358/12 |
| 5,136,391 A | 8/1992 | Minami | | 358/310 |
| 5,136,394 A | 8/1992 | Haikawa et al. | | 355/335 |
| 5,140,417 A | 8/1992 | Tanaka et al. | | 358/133 |
| 5,140,437 A | 8/1992 | Yonemitsu et al. | | 358/342 |
| 5,144,425 A | 9/1992 | Joseph | | 358/133 |
| 5,146,337 A | 9/1992 | Grubbs | | 358/191.1 |
| 5,148,272 A | 9/1992 | Acampora et al. | | 358/133 |
| 5,202,847 A | 4/1993 | Bolton et al. | | 364/725 |
| 5,212,549 A | 5/1993 | Ng et al. | | 358/135 |
| 5,218,449 A | 6/1993 | Ko et al. | | 358/330 |
| 5,225,946 A | 7/1993 | Uchiumi | | 360/72.1 |
| 5,237,460 A | 8/1993 | Miller et al. | | 360/8 |
| 5,253,041 A | * 10/1993 | Wine et al. | | 348/415 |
| 5,262,854 A | 11/1993 | Ng | | 358/133 |
| 5,282,049 A | 1/1994 | Hatakenaka et al. | | 358/335 |
| 5,313,303 A | 5/1994 | Ersoz et al. | | 348/439 |
| 5,325,124 A | 6/1994 | Keith | | 348/391 |
| 5,325,125 A | 6/1994 | Naimpally et al. | | 348/402 |
| 5,325,126 A | 6/1994 | Keith | | 348/418 |
| 5,335,117 A | 8/1994 | Park et al. | | 360/48 |
| 5,359,471 A | 10/1994 | Hasegawa | | 360/64 |
| 5,367,318 A | 11/1994 | Beaudin et al. | | 345/201 |
| 5,386,241 A | 1/1995 | Park | | 348/565 |
| 5,390,052 A | 2/1995 | Kato et al. | | 360/32 |
| 5,398,072 A | 3/1995 | Auld | | 348/426 |
| 5,408,270 A | 4/1995 | Lim | | 348/429 |
| 5,418,623 A | 5/1995 | Park | | 358/335 |
| 5,422,677 A | 6/1995 | Do | | 348/568 |
| 5,444,491 A | 8/1995 | Lim | | 348/441 |
| 5,477,397 A | 12/1995 | Naimpally et al. | | 360/10.3 |
| 5,614,952 A | 3/1997 | Boyce | | 348/392 |
| 5,614,957 A | 3/1997 | Boyce | | 348/567 |
| 5,635,985 A | 6/1997 | Boyce | | 348/402 |
| 5,646,686 A | 7/1997 | Pearlstein | | 348/392 |
| 6,215,822 B1 | * 4/2001 | Bose et al. | | 375/240.16 |

OTHER PUBLICATIONS

Bosveld et al., "A Refinement System for Hierarchical Video Coding", Visual Communications and Image Processing '90, Switzerland, Oct. 1–4, 1990, Proceedings of the SPIE,, vol. 1360, pp. 575–586.

"Transmission of Non–Telephone Signals", *Information Technology—Generic Coding of Moving Pictures and Associates Audio Information: Video, ITU–T Recommendation H.262*, 1995, pp. 1–201.

M.S.Hong, T.E. Kim, Y.K. Kim, G.M. Park, S.K. Kim, IEEE 1992 International Conference on Consumer Electronics Digest of Technical Papers, "Adaptive Bit Allocation Coder for DVCR Trick Play", Jun. 2, 1992, pp. 110–111.

P.Kauf, S.Rauthenberg, "A DCT Coding Scheme for digital HDTV Recording", Signal Processing of HDTV, III Proceedings of the 4th International Workshop on HDTV, Apr. 9, 1991, pp.33–41.

Richard Brush, "Design Considerations for the D–2 NTSC Composite DNTR", pps.182–193, SMPTE Journal, Mar. 1988.

Robert Rast, Joseph Glaab, General Instrument Corporation, "Interoperability Considerations for Digi Cipher HDTV", Oct. 1, 1992.

J.Lee, J.Seo, Y.Park, D.Youn, T.Oh, IEEE Transactions on Consumer Electronics, "A Sudy on New DCT–Based Bit Rate Reduction Algorithm and Variable Speed Playback for a Home–Use Digital VCR", vol.38, No.3, Aug. 1992, pp.236–241.

Advanced Television Research Consortium, "Advanced Digital Television, Prototype Hardware Description", Feb. 12, 1992.

David Sarnoff Research Center, Philips Laboratories, "Advanced Digital Television, System Description", Jan. 20, 1992.

International Standards Organization—Moving Picture Experts Group, Draft of Recommendation H.262, ISO/IEC 13818–1 titled "MPEG–2 Systems", Nov. 1993.

Zenith, AT&T, "Technical Details, Digital Spectrum Compatible", Sep. 23, 1991.

C.Yamamitsu, A.Ide, M.Nishino, T.Juri, H.Ohtaka, IEEE Transactions on Consumer Electronics, "A Study on Trick Plays for Digital VCR", vol.37, No.3, Aug. 1991, pp.261–266.

S.Inoue, H.Kaneko, H.Takao, T.Fujii, M.Ishibashi, IEEE Transactions on Consumer Electronics, "New Method for Variable Speed Playback for High Definition VCRs", vol.37, No.3, Aug. 1991, pp.244–251.

General Instrument Corporation Videocipher Division, "Digicipher HDTV System Description", Document No.62004, Aug. 22, 1991.

A. Hoffmann, B. Macq, and J.J. Quisquater, "Future Prospects of the Cable TV Networks, New Technologies and New Services", Laboratoire de Telecommunications et Teledetection, pp.13–22.

International Standards Organization—Moving Picture Experts Group, Draft of Recommendation H.262, ISO/IEC 13818–1 titled "Information Technology—Generic Coding of Moving Pictures and Associated Audio", Nov. 1993.

Dong–Ho Lee, Johg–Seok Park and Yung–Gil Kim, "HDTV Video Decoder Which Can Be Implemented with Low Complexity", pp. 6–7, IEEE Journal 1994.

K. R. Rao and P. Yip, "Discrete Cosine Transform—Algorithms, Advantages, Applications", Academic Press, Inc., 1990, pp. 141–143.

I.S.O. MPEG (Moving Pictures Expert Group), "Coding of Moving Pictures and Associated Audio for Digital Storage Media at up to about 1.5 Mbit/s, Part 2 Video", 2–11171 rev 1, Nov. 23, 1991 (copy printed Jun. 10, 1992).

* cited by examiner

# METHODS AND APPARATUS FOR PROCESSING LUMINANCE AND CHROMINANCE IMAGE DATA

RELATED APPLICATIONS

This application is a continuation-in-part of U.S. patent application Ser. No. 09/076,448, now U.S. Pat. No. 6,122, 321 titled "METHODS AND APPARATUS FOR REDUCING THE COMPLEXITY OF INVERSE QUANTIZATION OPERATIONS", which was filed on May 12, 1998 and which is hereby expressly incorporated by reference.

FIELD OF THE INVENTION

The present invention relates to video decoders, and more specifically, to methods and apparatus for reducing the cost of video decoders, e.g., MPEG compatible video decoders.

BACKGROUND OF THE INVENTION

Various digital applications, such as digital video, involve the processing, storage, and transmission of relatively large amounts of digital data representing, e.g., one or more digital images.

In order to reduce the amount of digital data that must be stored and transmitted in conjunction with digital applications, various digital signal processing techniques have been developed. These techniques involve, e.g., the variable length encoding of data, quantization of data, transform coding of data, and the use of motion compensated prediction coding techniques.

One standard proposed for the coding of motion pictures, commonly referred to as the MPEG-2 standard, described in ISO/IEC 13818-2 (Nov. 9, 1994) Generic Coding of Moving Picture and Associated Audio Information: Video (hereinafter referred to as the "MPEG" reference), relies heavily on the use of DCT and motion compensated prediction coding techniques. An earlier version of MPEG, referred to as MPEG-1, also supports the use of the above discussed coding techniques. In this patent application, references to MPEG-2 compliant data streams and MPEG-2 compliant inverse quantization operations are intended to refer to data streams and inverse quantization operations that are implemented in accordance with the requirements set forth in the MPEG reference.

In MPEG-2 chrominance data is normally encoded at one-half the resolution of luminance data. For example, four luminance blocks may be used to represent the luminance information associated with a portion of an image while two chrominance blocks are used to represent the same image portion.

Another standard which also uses motion compensated prediction, referred to herein as the ATSC standard, is specifically intended for television applications. The ATSC standard is described in a document identified as ATSC A/53 titled "ATSC DIGITAL TELEVISION STANDARD" (1994).

In accordance with both the MPEG and ATSC standards images, e.g., frames, can be coded as intra-coded (I) frames, predictively coded (P) frames, or bi-directional coded (B) frames. I frames are encoded without the use of motion compensation. P frames are encoded using motion compensation and a reference to a single anchor frame. In the case of a P frame, the anchor frame is a preceding frame in the sequence of frames being decoded. B frames are encoded using a reference to two anchor frames, e.g., a preceding frame and a subsequent frame. Reference to the preceding frame is achieved using a forward motion vector while reference to the subsequent frame is achieved using a backward motion vector. In MPEG, I and P frames may be used as anchor frames for prediction purposes. B frames are not used as anchor frames.

A known full resolution video decoder 2, i.e., an MPEG-2 video decoder, is illustrated in FIG. 1. As illustrated, the known decoder 2 includes a memory 30, a syntax parser and variable length decoding (VLD) circuit 4, inverse quantization circuit 16, inverse discrete cosine transform circuit 18, summer 22, switch 24, pair of motion compensated prediction modules 6 and 7 and a select/average predictions circuit 28 coupled together as illustrated in FIG. 1. The memory 30 includes both a coded data buffer 32 which is used for storing encoded video data and a reference frame store 34 used for storing decoded frames which may be used, e.g., as anchor frames and/or output to a display device.

For commercial reasons, particularly in the case of consumer products, it is desirable that video decoders be inexpensive to implement. The complexity of a decoder, in terms of the number of elements required to implement a decoder, is a factor which affects implementation costs. For this reason, an important issue in the design and implementation of video decoders is the minimization of complexity in terms of the amount of hardware, e.g., logic gates, required to implement a decoder.

A number of methods for reducing the complexity and/or cost of decoders have been developed. Examples of known method of reducing the cost of decoders include, e.g., the use of a preparser, the use of downsampled frames as prediction references, and the efficient implementation of the IDCT operation with downsampling. Video decoders which perform downsampling are sometimes referred to as "downsampling video decoders". Downsampling video decoders are discussed in U.S. Pat. No. 5,635,985 which is hereby expressly incorporated by reference.

FIG. 2 illustrates a known downsampling video decoder 10. The decoder 10 includes a preparser 12, a syntax parser and variable length decoding (VLD) circuit 14, an inverse quantization circuit 16, an inverse discrete cosine transform (IDCT) circuit 18, a downsampler 20, summer 22, switch 24, memory 30, a pair of motion compensated prediction modules 25, 27 and a select/average predictions circuit 28. The motion compensated prediction modules 25, 27 may include a drift reduction filter 26. The memory 30 includes a coded data buffer 32 and a reference frame store 34. The various components of the decoder 10 are coupled together as illustrated in FIG. 2.

In the known decoder 10, the preparser 12 receives encoded video data and selectively discards portions of the received data prior to storage in the coded data buffer 32. The encoded data from the buffer 32 is supplied to the input of the syntax parser and VLD circuit 14. The circuit 14 provides motion data and other motion prediction information to the motion compensated prediction modules 25, 27. In addition, it parses and variable length decodes the received data. The modules 25, 27 each include a motion compensated prediction filter 26. A data output of the syntax parser and VLD circuit 14 is coupled to an input of the inverse quantization circuit 16.

The inverse quantization circuit 16 generates a series of DCT coefficients which are supplied to the IDCT circuit 18. From the received DCT coefficients, the IDCT circuit 18 generates a plurality of integer pixel values. In the case of intra-coded images, e.g., I frames, these values fully represent the image being decoded. In the case of inter-coded images, e.g., P and B frames, the output of the IDCT circuit 18 represents image (difference) data which is to be combined with additional image data to from a complete representation of the image or image portion being decoded. The additional image data, with which the output of the IDCT circuit is to be combined, is generated through the use of one or more received motion vectors and stored reference frames. The reference frames are obtained by the MCP modules 25, 27 from the reference frame store 34.

In order to reduce the amount of decoded video data that must be stored in the memory 30, the downsampler 20 is used. In the case of inter-coded data, the downsampled video data output by the downsampler 20 is stored, via switch 24, in the reference frame store 34.

Motion compensated prediction modules 25 and 27 receive motion vector data from the syntax parser and VLD circuit 14 and downsampled anchor frames from the reference frame store 34. Using these inputs, they perform motion compensated prediction operations.

In the case of uni-directional motion compensation, the output of one of modules 25, 27 is selected by the select/average prediction circuit 28 and supplied to the summer 22. In the case of bi-directional motion compensation the values output by the modules 26 and 27 are averaged by the average predictions circuit 28. The values generated by the circuit 28 are supplied to the input of the summer 22.

In the case of inter-coded video data, the summer 22 is used to combine the output of the downsampler 20, with the output of the select/average predictions circuit 28. The resulting data which represents a decoded inter-coded video frame is stored, via switch 24, in the reference frame store 34.

The decoder 10 outputs the decoded video frames stored in the reference frame store 34 to be displayed on a display device. Because of the downsampling and pre-parsing operations, the decoded video frames are of a lower resolution than the resolution at which the frames were originally encoded.

The known reduced resolution video decoder illustrated in FIG. 2 can be implemented at lower cost than the standard full resolution decoder illustrated in FIG. 1. However, the known decoder 10 has the disadvantage that the images are of reduced resolution due to the use of downsampling.

Not only is it important that modern video decoders be capable of being implemented relatively efficiently, but is also likely to be important that they be capable of decoding video data in such a manner that video sequences, e.g., movies, can be displayed at height to width ratios other than that at which they were encoded. Such capability is important because, e.g., it allows images encoded at height to width ratios found in movie screens or high definition television (HDTV) to be played back on screens with different, e.g., standard definition television (SDTV) height to width ratios.

Currently, two techniques are commonly used for displaying images which were filmed or encoded at one height to width ratio on a screen that supports a second height to width ratio. The first technique is what is commonly referred to as "letter boxing". In this technique, the entire image is displayed at the original height to width ratio with black borders being added to, e.g., the top and bottom of the screen. By adding borders in this manner the portion of the screen which is not being used to display the image is blacked out.

The second technique for displaying images at a height to width ratio which is different from the images' original height to width ratio is commonly known as pan-and-scan. Using this technique, each image's center of interest is identified and the portion of the image, corresponding to the available screen dimensions, immediately surrounding the center of interest is selected for display. The portions of the image which are cropped are frequently referred to as side panels because one such panel is normally located on each side of the center of interest. The center of interest may be the center of the image but in many cases, e.g., in action scenes, may be off center. The center of interest in a sequence of images can change in position from one image to the next.

Notably, the MPEG specification allows for, but does not mandate, the transmission of center of interest information as part of an encoded bitstream.

While the known methods of reducing the cost of video decoders, such as the use of downsampling, have helped lower the cost of such devices, there still remains a need for new and improved methods and apparatus for reducing the cost of video decoders.

It is desirable that at least some of the cost saving methods and apparatus be suitable for use with full resolution video decoders since, in some applications reductions in resolution of the type caused by downsampling are unacceptable. It is also desirable that at least some cost reduction methods and apparatus be capable of being used in video decoders which support various display modes including, e.g., pan-and-scan.

SUMMARY OF THE PRESENT INVENTION

As discussed above, the present invention is directed to methods and apparatus for reducing the cost of video decoders, e.g., MPEG and ATSC compatible video decoders.

Various methods and apparatus of the present invention are directed to decoding frames as a function of whether all or a portion of an image is to be viewed. For example, in one embodiment, when the decoder is operated in a pan-and-scan mode of operation encoded data corresponding to B-frame side panels which will not be viewed is discarded. By discarding B-frame side panel data, the amount of processing required to decode a B-frame is reduced as well as the amount of memory required to store decoded B-frames prior to display. In the case of I and P frames to be decoded and displayed in pan-and scan mode, in various embodiments, side panel portions of the I and P frames are decoded using methods which reduce processing and/or storage requirements as compared to those associated with decoding the displayed image portions.

In one particular embodiment, side panel information is decoded and stored, e.g., through the use of downsampling, at a lower resolution than the image portions that are displayed. In another embodiment, P frame side panels are decoded using simplified inverse quantization techniques while the image areas to be displayed are decoded using standard (MPEG compliant) inverse quantization techniques.

Using decoding techniques of the present invention, processing and storage efficiencies can be achieved in pan-and-scan mode operation while still maintaining a representation of an entire I or P frame in the event that side panel data is required for use in a subsequent prediction.

In order to reduce decoding hardware and processing requirements methods and apparatus of the present invention are directed to improved techniques for performing inverse quantization operations on, e.g., predictively coded data. The inverse quantization methods and apparatus of the present invention are well suited for use in both full and reduced resolution video decoders. In various embodiments of the present invention, as will be discussed below, the simplified inverse quantization method of the present invention is used when decoding, e.g., B-frames, but not I or P frames. In other embodiments, the inverse quantization techniques of the present invention are used with both P and B frames.

The simplified inverse quantization techniques of the present invention reduce the amount of processing required to perform an inverse quantization operation on predictively coded data by treating an additive factor k used when performing inverse quantization arithmetic operations as always being zero and/or by eliminating the mismatch control operation performed as part of a standard inverse quantization operation.

Various other methods and apparatus of the present invention, suitable for use with decoders, e.g., various reduced resolution video decoders, which perform drift reduction filtering, are also described herein. Such methods and apparatus involve dynamically varying the complexity of performed drift reduction filtering as a function of whether luminance or chrominance data is being decoded. Dynamic control of drift reduction filtering complexity is particularly well suited for use in decoders, e.g., reduced resolution video decoders, which normally perform drift reduction filtering.

The methods and apparatus of the present invention can be used in a wide variety of applications. For example, they can be used to implement television receivers, video recorders, computers and a host of other devices which decode video data. Many of the methods of the present invention may be implemented in software executed on, e.g., a general purpose computer, or by dedicated hardware, e.g., integrated circuits used to implement a video decoder.

Numerous additional features and embodiments of the present invention are discussed in detail in the description which follows.

DETAILED DESCRIPTION

As discussed above, the present invention is directed to methods and apparatus for reducing the cost of video decoders.

A full resolution, i.e., non-downsampling, video decoder 300 implemented in accordance with one embodiment of the present invention will now be discussed with reference to FIG. 3.

Elements in FIG. 3 which bear the same names as elements of the known decoders 100, 200 are similar to the like named elements but may include slightly different functionality in accordance with the present invention, as will be discussed below.

Figure 3:
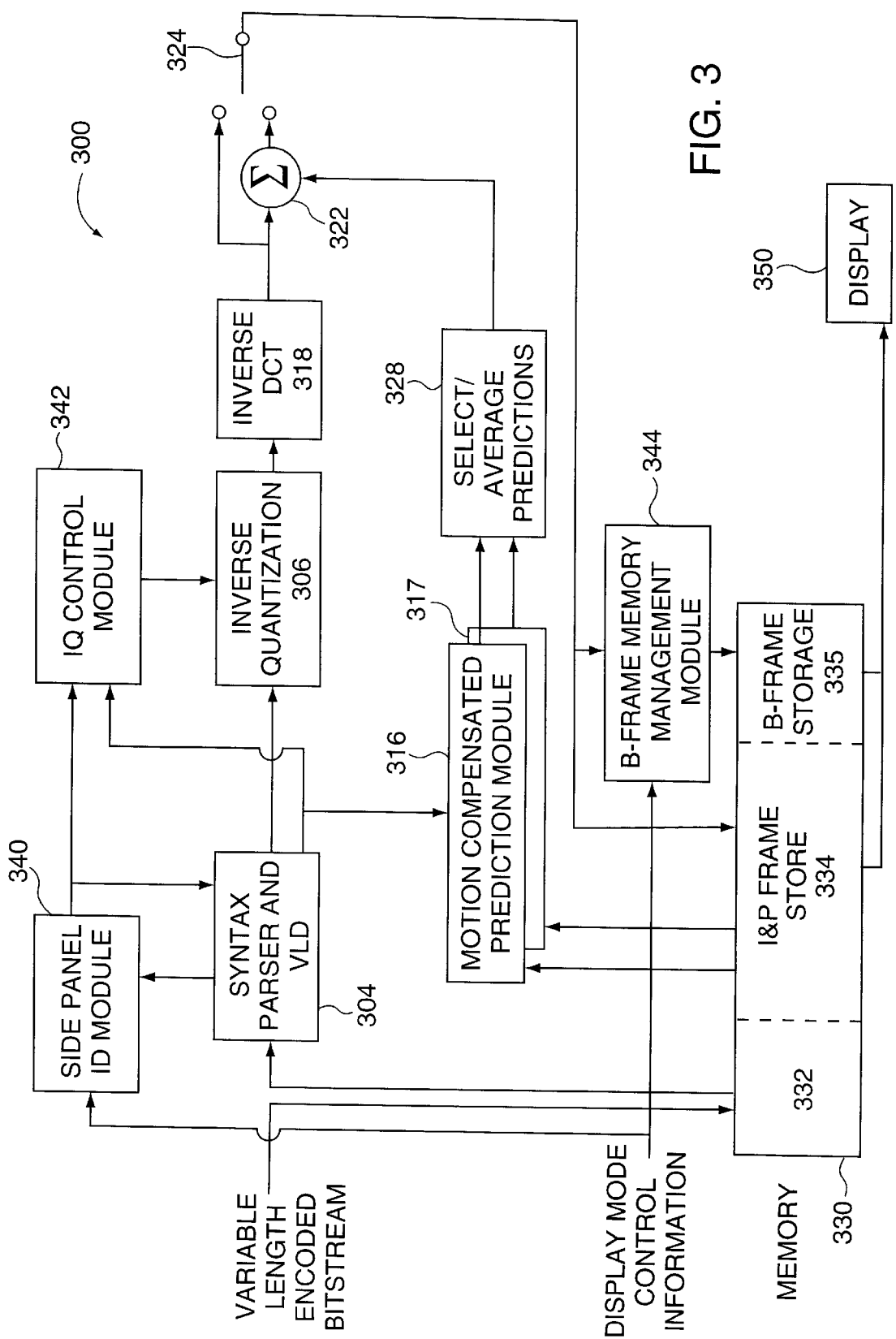
FIG. 3 illustrates a first video decoder implemented in accordance with an exemplary embodiment of the present invention.

As illustrated in FIG. 3, the video decoder 300 comprises a syntax parser and VLD circuit 304, an inverse quantization circuit 306, an inverse DCT circuit 318, a summer 322, switch 324, memory 330, pair of motion compensated prediction modules 316 and 317 and a select/average predictions circuit 328. In addition, the decoder circuit 300 includes a side panel ID module 340, an inverse quantization (IQ) control module 342 and a B-frame memory management module 344. As illustrated a display device 350 may be coupled to the output of the decoder's memory 330.

The memory 330 includes a coded data buffer 332, an I and P frame store 334 and a B-frame store 335. The various components of the decoder circuit 300 are coupled together as illustrated in FIG. 3. The B-frame store 335 is segmented from the I & P frame store 334. This is because, in modes of operation in which B frame side panels are not stored in accordance with the present invention, less memory is used to store each decoded B frame than is used to stored each decoded I or P frame.

Variable length encoded data in the form of a bitstream and display mode control information are both input to the decoder 300. The variable length encoded data may be, e.g., an MPEG compliant bitstream representing a sequence of images in the form of I, P and B frames. Information on each encoded image's center of interest may be included in the encoded bitstream.

Received encoded video data is stored in a coded data buffer portion 332, of the memory 300, prior to being supplied to the syntax parser and VLD circuit 304.

The display mode control information may be obtained, e.g., from a user controlled switch coupled to the decoder 300. This information indicates, e.g., whether complete images included in the variable length encoded bitstream are to be displayed or only a portion thereof. The display mode control information may indicate, e.g., that a user has selected to view the received images in a pan and scan format. During pan and scan mode operation entire received images are not to be displayed but rather only as much of the image that can fit on the display device's screen given its height to width ratio.

The display mode control information is supplied to, and used by, both the side panel ID module 340 and B-frame memory management module 344.

In addition to receiving the display mode control information, the side panel ID module 340 receives, from the syntax parser and VLD circuit 304, information about the center of interest of each image being decoded when such information is available from the encoded bitstream. In one embodiment, when center of interest information is not available, the center of interest is assumed to be the center of each received frame or image.

The side panel ID module 340 determines from the received display mode control information the display mode of operation being used. It also determines, as a function of received center of interest information, which portions of an image lie outside of the primary region of visual interest. In the case of pan-and-scan mode operation this involves determining what portions, if any, of the received encoded images will not be displayed. Portions of the image which will not be displayed are considered to be outside the primary region of visual interest.

Thus, in pan-and-scan mode operation, the side panel ID module 340 identifies the image side panels which will be cropped prior to display. This side panel information is provided to the IQ control module 342 and syntax parser and VLD circuit 304.

The syntax parser and VLD circuit 304 is responsible for parsing and variable length decoding the received encoded bitstream. As part of this process, data, e.g., macroblock data, corresponding to individual I, P and B frames is identified.

It is possible, although unlikely, for I and P frame image data outside the displayed image area, e.g., image side panel data, to be used as anchor frame data for subsequent predictions. However, since B-frames are not used as anchor frames, B-frame data, including side panel data, need not be stored for use in subsequent predictions. As part of the decoding process, the B-frames are normally stored prior to display to allow output of the decoded frames to the display device at the desired time intervals. In particular, when the encoded bitstream represents interlaced video with frame structured pictures, or progressive video at a lower frame rate than the display rate, B frames are generally stored in memory to allow the time of decoding to be decoupled from the time of display.

Recognizing that B-frame data may have to be stored prior to display but not for use as anchor frame data, in one embodiment of the present invention, the syntax parser and VLD circuit 304 discards B-frame data corresponding to image areas, e.g., side panels, which will not be displayed. This eliminates the need for the remaining circuits of the decoder 300 to process and store data corresponding to portions of B-frames which will not be displayed. Thus, by operating the syntax parser and VLD circuit 304 to discard received data corresponding to image portions which will not be displayed or used for predictions in accordance with the present invention, a reduction in the amount of processing required to decode an encoded bitstream is achieved.

In the above described manner, when the displayed picture area is smaller than the area of the picture or image being decoded, computational savings are obtained by controlling the decoder 300 to skip over bits corresponding to B-frame macroblocks that lie outside the displayable image area. This control function, performed by the side panel ID module 340, saves memory and computations, without affecting the delivered picture quality, since B frames are not used for decoding subsequent pictures.

An information data output of the syntax parser and VLD circuit 304 is coupled to the input of the motion compensated prediction modules 316, 317, and to a second input of the IQ control module 342. The information supplied to the motion compensated prediction module 306 and IQ control module 342 by the syntax parser 304 includes, e.g., frame and macroblock type information.

The IQ control module 342 is used to control the inverse quantization circuit 306. The inverse quantization circuit 306 is capable of performing a standard inverse quantization operation in accordance with the MPEG standard, or a simplified inverse quantization operation, e.g., a non-exact inverse quantization operation in accordance with the present invention. The IQ control module controls the type of inverse quantization operation that is performed. In one embodiment, it does this as a function of the frame type and the position of the data being decoded relative to an image's center of interest.

In one particular embodiment, the IQ control module 342, controls the IQ circuit 306 so that a standard inverse quantization operation is performed on intra-coded frames, an exact inverse quantization operation is performed on the portion of P-frames which is to be displayed, a simplified inverse quantization operation is performed on the data corresponding to the side panels of P-frames; and a simplified inverse quantization operation is performed on B-frame data output by the syntax parser and VLD circuit 304.

Operation of the inverse quantization circuit 306 which uses the new and novel simplified inverse quantization methods of the present invention to processes predictively coded data will be discussed in detail below. A data output of the inverse quantization circuit 306 is coupled to an input of the inverse discrete cosine transform (IDCT) circuit 318.

Figure 1:
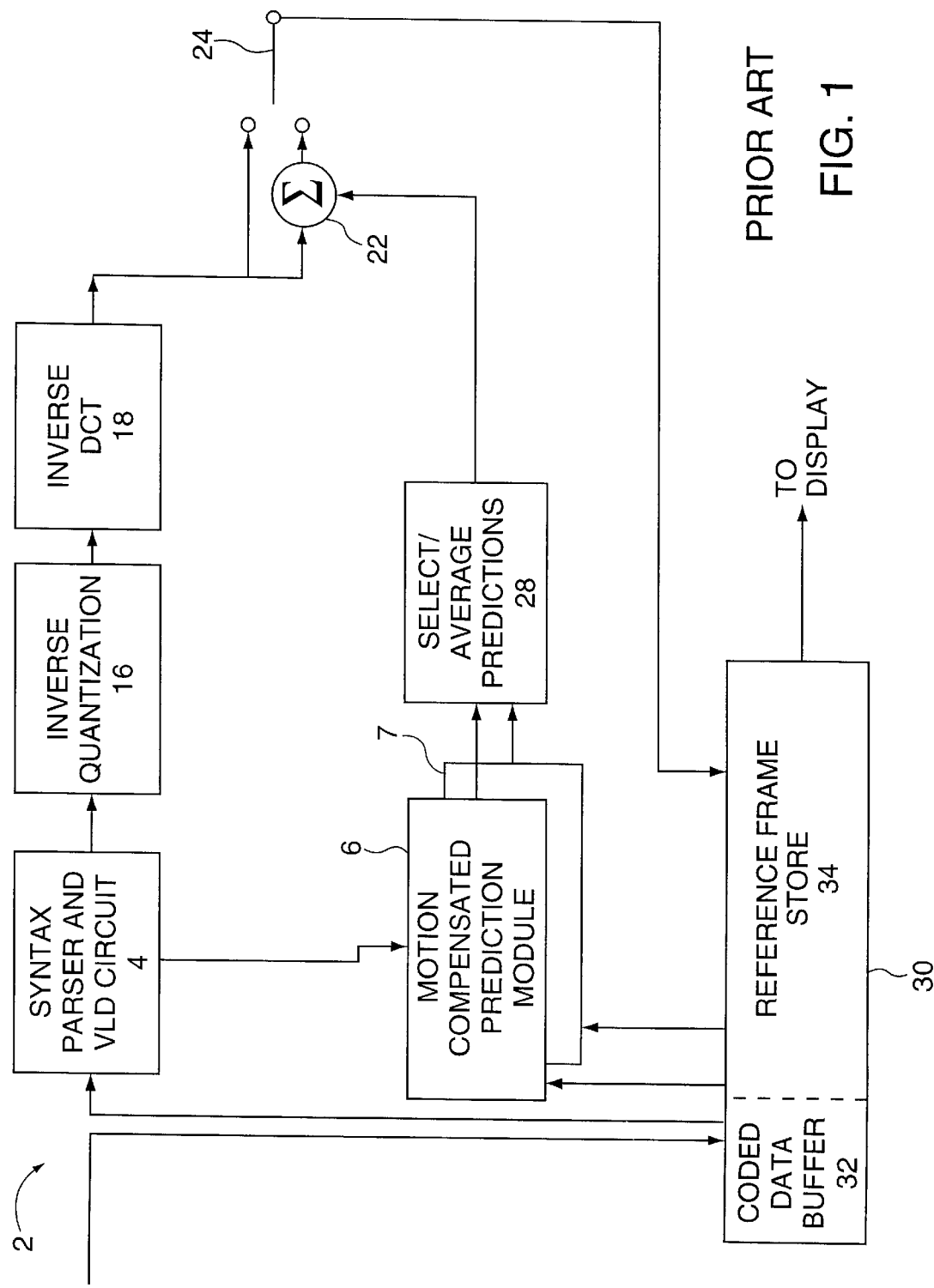
FIG. 1 illustrates a known full resolution video decoder.
Figure 2:
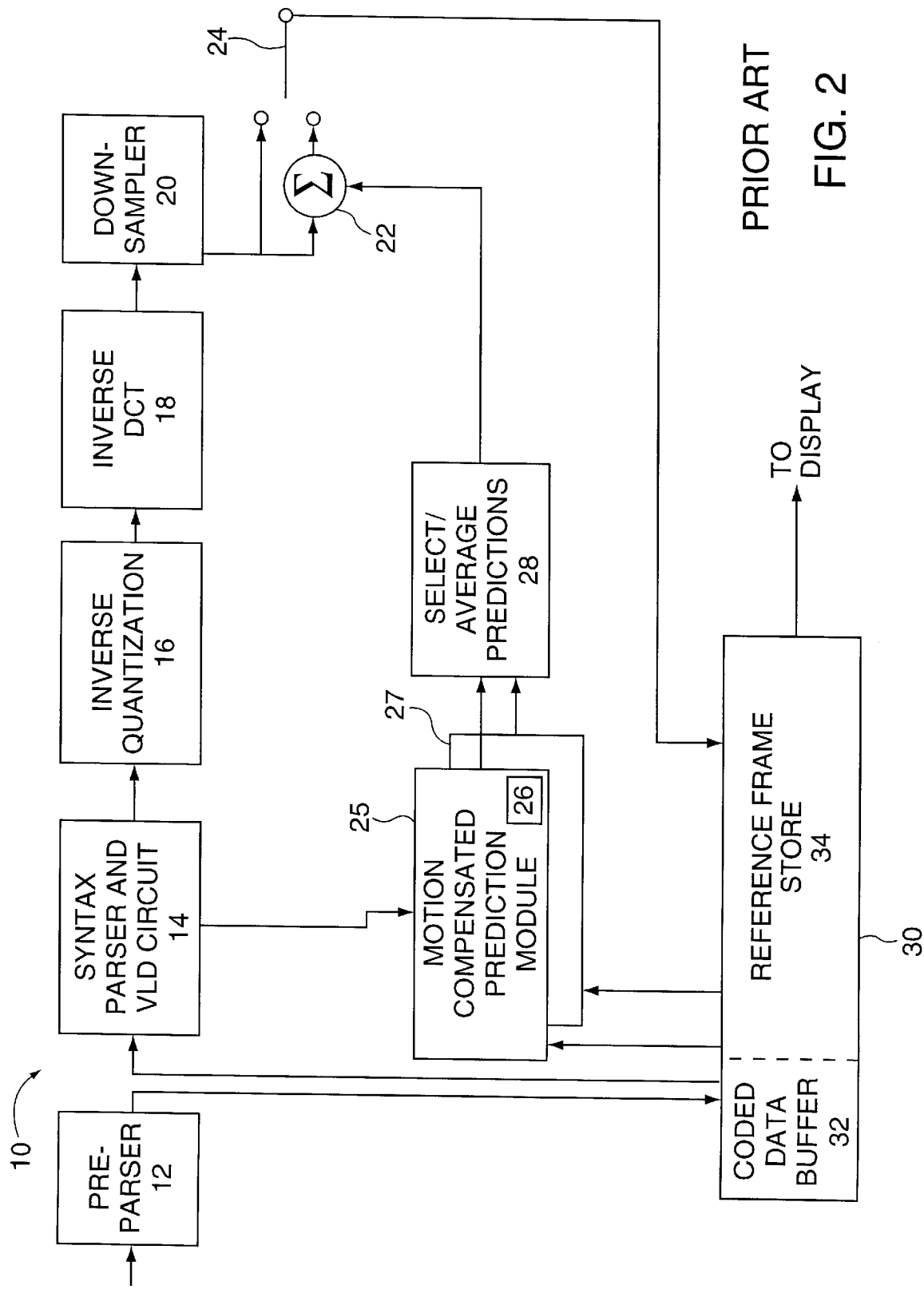
FIG. 2 illustrates a known downsampling video decoder.

The IDCT circuit 318, switch 324, summer 322, motion compensated prediction modules 316, 317 and select/average predictions circuit 328 are all coupled together as illustrated in FIG. 3. The arrangement of these components 316, 317, 328 is the same as or similar to the way like named components of the known decoder of FIG. 1 are coupled together. While these components 318, 322, 324, 306, and 328 serve the same or similar functions as the like named elements of the known decoder 100, they are capable of processing B frame data representing an image of the same or a different size than the processed I and P frames. Accordingly, these components 318, 322, 324, 316, 317 and 328 are capable of processing the B frame data even when B-frame side panel data has been discarded by the syntax parser and VLD circuit 304.

The output of the switch 324, via which decoded video data is supplied to the memory 330 for storage prior to display and/or use as reference frame data, is coupled to the B-frame memory management module 344 and to the I and P frame store 334. The decoded video data representing I and P frames is stored in the I & P frame store 334. B-frame data is stored in the B-frame store 335, prior to display, via the B-frame memory management module 344.

In addition to decoded B-frame data, the B-frame memory management module 344 receives as an input, the display mode control information. The B-frame memory management module 344 is responsible for controlling the locations at which the decoded data representing B-frames is stored in the memory 330 to insure the efficient utilization of available memory. In some modes of operation entire B-frames are stored in the B-frame store 335. In other modes of operation, e.g., pan-and-scan modes of operation, in accordance with the present invention, only the portions of the decoded B frames which are going to be displayed are stored in the B-frame store 335. The B-frame memory management module uses the display mode control information to determine what B-frame data is to be stored and the memory addresses at which B-frame data should be stored. In this manner efficient use of the available memory is achieved.

In one particular embodiment, the B-frame management module is sensitive to display mode control information, and acts to allocate memory for temporary storage of the displayable portion of B-frames, when pan-and-scan display mode is selected. Since decoded image data corresponding to side panel B frame macroblocks are not stored or displayed in this mode of operation a reduced amount of memory is allocated by the B-frame memory management module 344 for the storage of B frames when pan-and-scan mode is selected.

As discussed above, one feature of the present invention is directed to performing a simplified inverse quantization operation on at least some of the predictively coded data supplied to the inverse quantization circuit 306.

The inverse quantization process is used extensively in the digital processing of signals such as digitally compressed images and digitally compressed video.

Quantization is the process that is used in the digital processing of signals in which an element from a finite set of digital codewords is used to represent, approximately, the value of a continuous-amplitude sampled signal. The digital codewords that are produced by the quantization process for an input sample represent an approximation of the original amplitudes of the signal being processed.

The opposite process of quantization is appropriately called inverse quantization. The inverse quantization process takes as its input a digital codeword from a finite set of codewords and produces a so called reconstruction level that is an approximation of the original amplitude of the sample.

Figure 5:
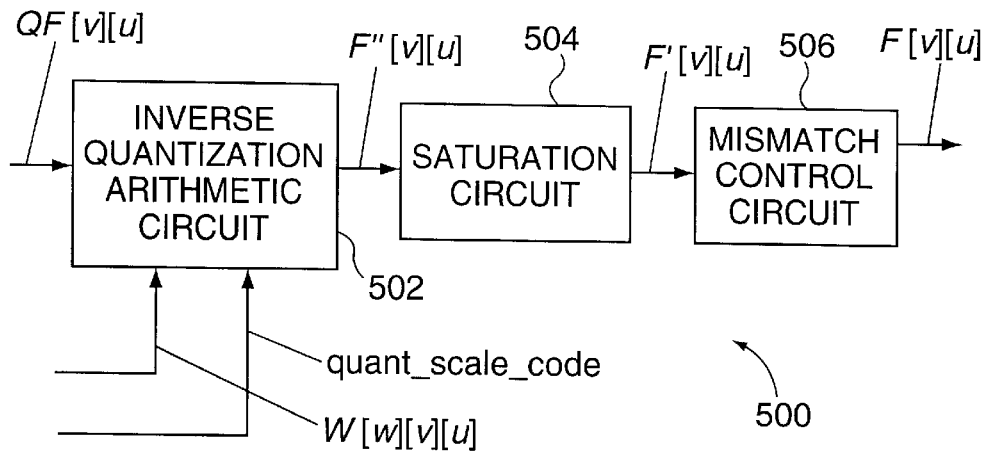
FIG. 5 illustrates a known circuit for performing an inverse quantization operation.

The international standard ISO/IEC 13818-2 which describes MPEG-2 defines methods for the inverse quantization of DCT coefficients. The ATSC A/53 standard, by reference to MPEG, defines the inverse quantization methods to be the same as those of the MPEG standard. In both of these standards, the inverse quantization of one 8×8 block of coefficients, with the exception of the DC coefficients of intra-coded blocks, is specified by equations (1)–(5) which are set forth below. A known inverse quantization circuit for implementing a standard inverse quantization operation in accordance with equations (1)–(5) is illustrated in FIG. 5.

As illustrated, the known circuit 500 includes an Inverse Quantization Arithmetic circuit 502, a saturation circuit 504 and a mismatch control circuit 506.

The inputs to the inverse quantization circuit 502 are QF[v][u], W[w][v][u] and a quantizer_scale and $$\text{sign}(x) = \begin{cases} +1 & x > 0 \\ 0 & x = 0 \\ -1 & x < 0 \end{cases} \quad (3)$$

The coefficients F"[v][u] resulting from the processing performed by the inverse quantization arithmetic circuit 502, are processed by a saturation stage to ensure that the reconstructed values lie within an allowed range. The saturation operation, which yields the coefficients F'[v][u] performed by the saturation circuit 504 is set forth as equation (4) below.

$$F'[v][u] = \begin{cases} 2047 & F''[v][u] > 2047 \\ F''[v][u] & -2048 \leq F''[v][u] \leq 2047 \\ -2048 & F''[v][u] < -2048 \end{cases} \quad (4)$$

The final step in the standard inverse quantization process is to perform a mismatch control operation to yield the final reconstructed DCT coefficients F[v][u] which may then be supplied to the IDCT circuit 18. The mismatch control circuit 506 is responsible for performing the mismatch control operation set forth below as equation (5) using the coefficient values F'[v][u] output by the saturation circuit 504.

$$\text{sum} = \sum_{v=0}^{7} \sum_{u=0}^{7} F'[v][u] \quad (5)$$

$$F[v][u] = F'[v][u] \forall u, v \text{ except } u = v = 7$$

$$F[7][7] = \begin{cases} F'[7][7] & \text{if sum is odd} \\ \begin{cases} F'[7][7] - 1 \text{ if } F'[7][7] \text{ is odd} \\ F'[7][7] + 1 \text{ if } F'[7][7] \text{ is even} \end{cases} & \text{if sum is even} \end{cases}$$

where:

QF[v][u] is a two dimensional array of digital codewords or quantized DCT coefficients, W[w][v][u] is a quantizer matrix, and quatizer_scale is a common scaling factor used for one or more macroblocks. The parameters v and u are used to index each DCT coefficient and the parameter w depends upon the coding type (INTRA or NON-INTRA and the color component (luminance or chrominance.) In the decoder 100, these values are part of the data provided by the syntax parser and VLD circuit 14 to the inverse quantization circuit 16.

The known inverse quantization arithmetic circuit 502 implements equations (1)–(3) set forth below.

$$F''[v][u] = \frac{(2 \times QF[v][u] + k) \times W[w][v][u] \times \text{quantizer\_scale}}{32} \quad (1)$$

where:

$$k = \begin{cases} 0 & \text{INTRA} \\ \text{sign}(QF[v][u]) & \text{NON INTRA} \end{cases} \quad (2)$$

Equations (1)–(5) are specified in the international standard ISO/IEC 13818-2 standard. For the inverse quantization operation of quantized DCT coded data to be compliant with the standard, equations (1)–(5) must be used to implement the inverse quantization process for the coded blocks.

Table I below shows an analysis of the number of discrete operations that are required to implement the equations assuming the most costly case, in terms of the number of required computations, of performing an inverse quantization operation on NON-INTRA coded data.

TABLE I

Number of operations required to implement equations (1)–(5)

| Equation | operations per coefficient | | | | Total for 64 coefficients |
|---|---|---|---|---|---|
| | Add/Sub | Mult/Div | Compare | Total | |
| (1) | 1 | 4 | 0 | 5 | 320 |
| (2), (3) | 0 | 0 | 2 | 2 | 128 |
| (4) | 0 | 0 | 2 | 2 | 128 |
| (5) | 65* | 0 | 2* | — | 67 |
| Total operations | | | | | 643 |

*for all 64 coefficients

An accepted method of obtaining efficient implementations of algorithms is to express the algorithm as a linear operator and then find some sparse factorization of the linear operator. While this has worked well as a technique for simplifying IDCT operations it is not applicable to the problem of computing the inverse quantization of NON-INTRA coded data because it is not possible to represent exactly, the equations (1)–(5) as a linear operator.

Recognizing that it is not possible to use a linear operator formulation to represent exactly, equations (1)–(5) in a simplified form, the inventors of the present application set about finding other ways to simplify the inverse quantization process. The inventors of the present application realized that it is possible to approximate the result of the processing achieved by performing equations (1)–(5) without having to perform all the processing required to fully implement all of these equations. Accordingly, various embodiments of the inverse quantization method of the present invention, approximates the overall processing results that would normally be achieved by accurately implementing equations (1)–(5).

In particular, various embodiments of the present invention focus on simplifying the inverse quantization process by eliminating equation (2) and treating the additive factor k found in equation (1) as being 0 when processing both INTRA and NON-INTRA coded data. Other embodiments of the present invention are directed to eliminating the use of the mismatch control circuit and thereby eliminating the mismatch control operation set forth in equation (5) from the inverse quantization process. In accordance with the present invention these inverse quantization simplification techniques may be selectively applied, as discussed below. The application of the inverse quantization techniques, e.g., on a macroblock or block basis, can depend on the type of frame or image being processed and/or the location of the portion of the image represented by the set of quantized DCT coefficients being processed.

The inverse quantization methods of the present invention may result in a less than exact reconstruction of the image data being processed. However, in most cases the inverse quantization techniques of the present invention produce satisfactory results in terms of image quality while providing advantages in terms of speed and implementation costs That is, the inverse quantization methods of the present invention tend to provide for a fast and hardware efficient inverse quantization process.

The inverse quantization methods of the present invention make it is possible to reduce the computational cost of the inverse quantization process while maintaining a high level of picture quality. As discussed above, the simplified non-exact inverse quantization processes of the present invention used to process P and B frames, differ from the standard, i.e., MPEG and ATSC specified inverse quantization operations, in the application of the additive factor k present in equation (1) and the use of mismatch control as set forth in equation (5). The IQ control module 342 is responsible for determining when the simplification involving treating the additive factor k as being 0 for both NON-INTRA coded and INTRA coded data is employed and when performing a mismatch control operation is to be skipped.

Figure 6:
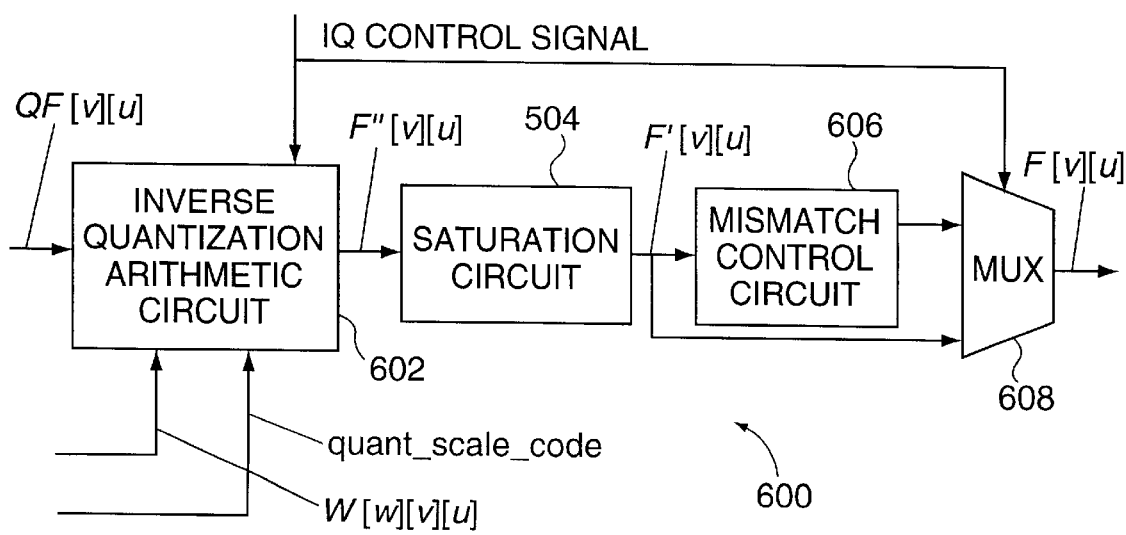
FIG. 6 illustrates an inverse quantization circuit implemented in accordance with the present invention.

FIG. 6 illustrates an inverse quantization circuit 600 implemented in accordance with one embodiment of the present invention. The circuit 600 includes an inverse quantization arithmetic circuit 602, a saturation circuit 504, and a mismatch control circuit 606 coupled together in series as illustrated in FIG. 6. The inverse quantization circuit 600 also includes a multiplexer (MUX) 608. The multiplexer 608 receives, as first and second data inputs, the coefficients output by the mismatch control circuit 606 and the coefficients output by the saturation circuit 504, respectively.

In the FIG. 6 embodiment, a two bit IQ control signal output by, e.g., the IQ control circuit 342, is supplied to control inputs of the inverse quantization arithmetic circuit 602 and MUX 608. The first bit of the IQ control signal is used to control when the inverse quantization arithmetic circuit 602 is to treat the additive factor k as being 0 for both NON-INTRA and INTRA coded data. The second bit of the control signal is used to control which input of the MUX 608 is to be output, e.g., to an IDCT circuit, as the DCT coefficients resulting from the inverse quantization operation performed by the circuit 600.

By asserting the bit used to control the MUX 608, the inverse quantization control module 342 can cause the signal supplied to the second input of the MUX 608 to be output as the result of the inverse quantization operation. This eliminates the use of the mismatch control circuit 606 when performing an inverse quantization operation.

Various embodiments of the present invention which relate to selectively using 0 as the value of the additive factor k and/or eliminating the mismatch control operation from the inverse quantization process will now be discussed.

One embodiment of the present invention involves the use a non-exact (e.g., non-MPEG-2 compliant) inverse quantization process for predictively coded (P and B) frames while using an MPEG-2 compliant inverse quantization process for (I) frames.

Normally, the additive factor k, is determined for each quantized coefficient of a set of such coefficients Q[v][u] and thus, the value of k can normally vary as a function of the value of each non-intra-coded coefficient of the set of quantized coefficients Q[v][u].

In one embodiment of the present invention, the value of k is set to zero for all NON-INTRA macroblocks when performing an inverse quantization operation on P and B frame data. In such an embodiment, the value of k is treated as being 0 for all elements of a block of coefficients representing a portion of a predictively coded frame, e.g., P or B frame.

In another simplified inverse quantization embodiment, application of a non-zero value as the additive factor k is restricted to only NON-INTRA macroblocks in P frames. This implementation is described in Eq. (6) below.

$$k = \begin{cases} 0 & I, B - \text{frames} \\ \text{sign}(QF[v][u]) & \text{non} - \text{INTRA in } P - \text{frames} \end{cases} \quad (6)$$

In this case I and P frames will be reconstructed in a fully MPEG compliant manner, but B frames will be reconstructed using the simpler inverse quantization process of the present invention. Since B frames generally require more processing resources than I or P frames to perform an inverse quantization operation the simplified inverse quantization process of the present invention can provide significant hardware savings even when applied only to B frames. Furthermore, by limiting application of the simplified inverse quantization technique of the present invention to B-frames, propagation of errors introduced as a result of the simplified inverse quantization process, into additional frames, is avoided. This is because unlike P-frames, B-frames are not used as anchor frames.

The effect of treating the additive factor, k, as being 0 in accordance with the present invention is to impart, to the images decoded using this technique, a degree of quantization noise that is above what is normal. Visually this effect can be characterized as increased background noise. For the quality loss due to the used of the simplified inverse quantization process to be noticed, the level of noise present in the image must be relatively high.

Significantly, when the simplified inverse quantization techniques of the present invention are applied to frames which are part of a Group of Pictures ("GOP"), the GOP structure causes a refreshing of the picture at every instance of an I or P-frame. This fact prevents the quantization errors in P-frames from accumulating indefinitely.

In the case where application of the simplified quantization techniques of the present invention are limited to B-frames as in equation (6), the additional quantization noise, resulting from the methods of the present invention, is restricted to each individual B-frame, and no accumulation of quantization noise occurs.

In accordance with another embodiment of the present invention mismatch control is not carried out for macroblocks being processed using the simplified non-compliant, inverse quantization process of the present invention. Mismatch control is intended to prevent undesirable effects when an MPEG or ATSC standard inverse quantization operation is performed. It has been discovered that the mismatch control operation performed during a standard inverse quantization operation provides little or no benefit when employing the simplified non-standard inverse quantization process of the present invention.

Thus, in accordance with the present invention further reduction in the computational cost of performing an inverse quantization operation is achieved by not performing a mismatch control operation.

By, e.g., setting k=0, in accordance with the present invention when processing I, P and B frame data as set forth in equation (7), equation (1) is reduced to equation (8).

$$k=0 \qquad (7)$$

$$F''[v][u] = \frac{(2 \times QF[v][u] \times W[w][v][u] \times \text{quantizer\_scale}}{32} \qquad (8)$$
$$= QF[v][u] \times W'[w][v][u]$$

Equation (8) has the advantage that it can be implemented using one multiplication per coefficient being processed.

By elimination of the mismatch control operation as discussed above, further computation savings are achieved. Table II below shows the reduction in computational cost that may be obtained using the non-exact inverse quantization process with k=0 and the mismatch control operation being eliminated.

TABLE II

Number of operations required for simplified inverse quantization in accordance with Equation (8) and eliminating the mismatch control operation

| Equation | operations per coefficient | | | | Total for 64 coefficients |
|---|---|---|---|---|---|
| | Add/Sub | Mult/Div | Compare | Total | |
| (8) | 0 | 1 | 0 | 1 | 64 |
| (4) | 0 | 0 | 2 | 2 | 128 |
| Total operations | | | | | 196 |

The results set forth in Table II is a 70% reduction in the number of operations as compared to those used to implement a standard inverse quantization operation set forth in Table I.

Various features of the present invention, such as discarding of B-frame data that will not be viewed without decoding it and the performing of a simplified inverse quantization operation on all or some predicted image data have been explained with reference to the full resolution video decoder illustrated in FIG. 3. These features and additional features of the present invention may be used to implement a multi-resolution or reduced resolution video decoder as well.

Figure 4:
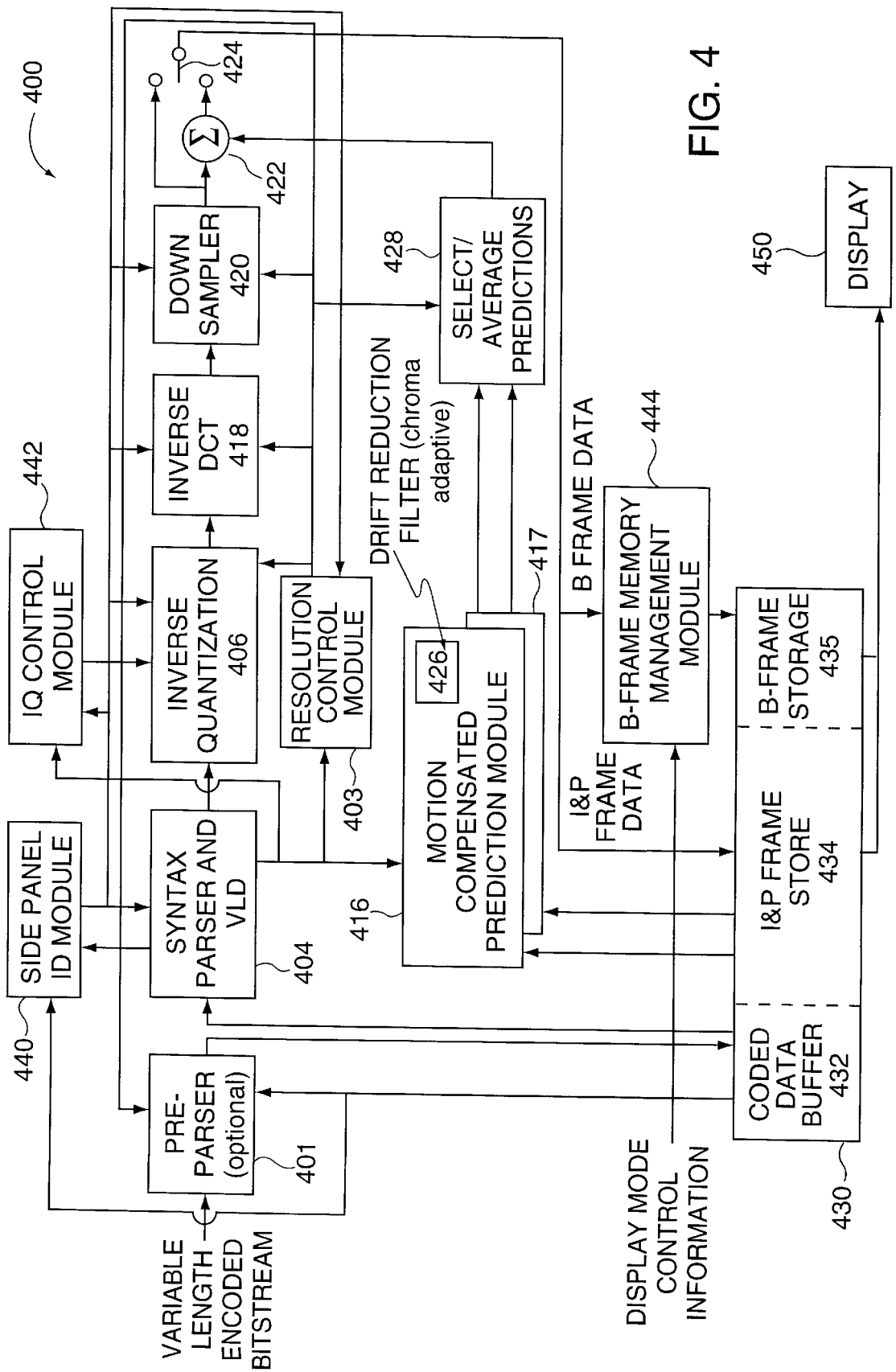
FIG. 4 illustrates a video decoder, implemented in accordance with the present invention, capable of decoding various video data either at full resolution, reduced resolution, or with different portions at different resolutions.

Various features of the present invention will now be discussed with reference to the multi-format video decoder 400 illustrated in FIG. 4. The decoder 400 illustrated in FIG. 4 is capable of decoding, for example, high definition television (HDTV) signals at a reduced resolution, e.g., standard definition television (SDTV) resolution. It is also capable of decoding standard television signals at full resolution. This is accomplished via the selective application of downsampling and/or other data reduction techniques.

FIG. 4 illustrates a multi-format video decoder implemented in accordance with one embodiment of the present invention. Components which perform the same or similar functions to those of previously described components bear the same names and will not be described again in detail. Notably, while many of the components of the decoder 400 perform similar functions to those of the known decoders, many of the components in the FIG. 4 embodiment differ from those of like named known components in that many of the components of the FIG. 4 decoder are responsive to control signals from both side panel ID module 440, which is implemented in accordance with the present invention, and a resolution control module 403.

As illustrated in FIG. 4, the decoder 400 comprises an optional preparser 401, a memory 430, syntax parser and VLD circuit 404, inverse quantization circuit 406, IDCT circuit 418, downsampler 420, summer 422, switch 424, first and second motion compensated prediction modules 416, 417, a select/average predictions circuit 428, a B-frame memory management module 444 and a display 450. In addition, in accordance with the present invention, the decoder 400 includes a side panel ID module 440, IQ control module 442 and resolution control module 403. The various components of the decoder 400 are coupled together as illustrated in FIG. 4.

In the FIG. 4 embodiment, the memory 430 is divided into a coded data buffer segment 432, an I & P frame store 434 and a B-frame store 435. As in the case of the FIG. 3 decoder embodiment, the B-frame memory management module 444 receives display mode control information and decoded B-frame data. The B-frame memory management module 444 controls the storage of decoded B-frame data so that the memory space 435 is used efficiently, particularly when data representing portions of received B-frames, e.g., B-frame side panels, is discarded prior to storage.

In addition to the components discussed above, the decoder 400 includes, in accordance with the present invention, a side panel ID module 440, an IQ control module 442, and a resolution control module 403.

The side panel ID module 440 receives the display mode control information via a first input. In addition, from the syntax parser and VLD circuit 404, it receives information about the center of interest of the received encoded frames when such information is available from the encoded received encoded bitstream. When such center of interest information is not received from the syntax parser and VLD circuit 404, it is presumed to be the center of the image.

The side panel ID module 440 identifies, image areas outside the center of interest, e.g., image side panels, and provides this information to the IQ control module 442, syntax parser and VLD circuit 404, inverse quantization circuit 406, IDCT circuit 418, downsampler 420, resolution control module 403, and drift reduction filters 426, 427 of the motion compensated prediction modules 416, 417, respectively. The various circuits which receive the side panel information use this information in determining the processing to be applied to particular data.

The IQ control module 442 and resolution control module 403, perform control functions. In particular, the IQ control module 442, determines when a simplified, as opposed to standard MPEG or ATSC compliant, IQ operation should be performed on predicted data. The resolution control module 403 controls the resolution at which various image portions will be decoded. It can also control the particular type of simplified inverse quantization operation that is performed as will be discussed below.

The resolution control module 403 receives as its inputs frame, motion vector, and other information from the syntax parser and VLD circuit 404 from which it can determine, e.g., whether an HDTV signal or an SDTV signal is being processed. In addition, the resolution control module receives center of interest and side panel information from the side panel ID module.

In accordance with one embodiment of the present invention, the resolution control module 403 uses the received input signals to determine which images, and/or image portions, are to be decoded at full resolution, e.g., the resolution at which they were encoded, and which images or image portions are to be decoded at one or more reduced levels of resolution.

In one embodiment of the present invention, the resolution control module 403 is responsible for controlling the decoding of HDTV images such that they are downsampled and displayed at a maximum resolution equivalent to SDTV resolution. This allows HDTV images to be decoded using the same or approximately the same amount of memory required to implement an SDTV decoder. In the same embodiment the resolution control module controls the downsampler 420 so that SDTV images are not downsampled but, instead, decoded and displayed at full resolution.

To further reduce the amount of memory required to implement a video decoder and or the amount of processing that must be performed by a video decoder, various embodiments of the present invention are directed to decoding different portions of the same image or frame at different resolutions and/or processing different image portions using processing techniques which differ in terms of their computational complexity. In various embodiments, the resolution and/or processing used to decode a particular image portion depends on the visual importance of the image portion being decoded and/or whether or not the decoded image portion is to be displayed.

The resolution control module 403, in combination with the side panel ID model 440, is responsible for controlling the resolution and processing of various image portions. In one such embodiment, the resolution control module 403 controls the various circuits 406, 418, 420, 416, 417, 428 of the decoder 400 to: 1) perform less computationally intensive processing operations on image areas which will not be displayed or which are further away from the image's center of interest than other image portions and/or to 2) discard data, not process, and/or to reduce the amount of data used to represent image areas which will not be displayed or which are furthest away from an image's center of interest.

For example, when processing SDTV images to be displayed in pan-and-scan mode operation, the resolution control module 403 controls the downsampler to downsample I and P frame side panel data while outputting the data corresponding to the image area to be displayed without performing downsampling thereon. Notably, the inverse quantization circuit 406 may also be controlled to perform simplified inverse quantization operations on predicted data corresponding to side panel macroblocks while performing standard inverse quantization operations on data corresponding to predicted macroblocks in the area to be displayed.

In at least one embodiment, when processing SDTV images which will be completely displayed, the resolution control module controls the downsampler 420 to perform downsampling on the image being decoded. For example, the portion of the image at the image's center of interest may not be downsampled at all, portions of the image at a first distance away from the center of interest may be downsampled at a first rate, and portions of the image furthest away from the center of interest may be downsampled at a second rate which is greater than the first downsampling rate.

An image is normally represented using chrominance as well as luminance information. The chrominance and luminance information is frequently represented using separate blocks of data to represent the chrominance and luminance information corresponding to the same portion of an image. The downsampler 420 can be used to independently downsample chrominance and luminance data corresponding to the same portion of an image. The resolution control module 403, can, and in one embodiment is, used to control the downsampler 420 and thus the resolution at which chrominance and luminance data is stored.

Humans are relatively insensitive to distortions introduced in the chrominance (color) components of an image compared to the luminance components of an image. In one embodiment of the present invention, chrominance and luminance data corresponding to the same portion of an image are stored at different resolutions allowing for a relatively efficient use of available memory and processing power. In such an embodiment, the downsampling of chrominance data is performed, e.g., in the absence of downsampling of corresponding luminance data. Alternatively, chrominance data is downsampled at a greater rate than luminance data corresponding to the same portion of the image as the chrominance data being downsampled.

In accordance with the present invention, the computational complexity of chrominance data processing can be reduced in several ways including using reduced precision arithmetic, using reduced order prediction filters, or processing chrominance blocks at reduced spatial resolution relative to that of the collocated luminance blocks.

In the decoder 400, the motion compensated prediction modules 416, 417 each include an adaptive drift reduction filter 426. The filter 426 may be used, e.g., to reduce the amount of drift introduced as a result of downsampling. The motion compensated prediction modules, 416, 417 also include scaling circuits, e.g., interpolation and/or decimation circuits, capable of converting stored image portions to the resolution at which the motion vectors are to be applied. In the case where different portions of a reference frame are stored at different resolutions, the scaling circuits included in the prediction modules 416, 417, in one embodiment, scale image portions stored at different resolutions by differing amounts so as to match that of the macroblock being processed.

As discussed above, one feature of the present invention is directed to varying the complexity of prediction operations, and prediction filtering complexity in particular, as a function of whether luminance or chrominance data is being decoded. In this context, complexity may be interpreted in terms of the number of gates required to implement the mathematical processing operations which must be performed to complete a task such as filtering. Accordingly, a more complex filtering operation will require more mathematical operation's such as additions and/or multiplications, and thus more gates to implement, than a less complex operation.

In accordance with this feature of the present invention the complexity of the prediction filtering is varied based on whether luma or chroma information is being processed. In particular, advantage is taken of the fact that the human visual system is relatively insensitive to distortions introduced in the chroma components of a picture. Accordingly, in one embodiment more accurate, but more computationally intensive, prediction filtering is performed by the filters 426 when processing luminance information and less accurate, but computationally simpler, prediction filtering is performed when processing chrominance information.

Thus, in the FIG. 4 embodiment, the chroma adaptive drift reduction filter 426 is a filter whose operation depends on whether luminance or chrominance information is being processed. The filter 426 operates by employing higher complexity filtering when processing luminance components than when processing chrominance picture components. In this manner, the reconstructed quality of the luminance components will generally be more accurate than that of the chrominance components, and there will be a relative reduction in the computational resources used in computing the chrominance components.

What is claimed is:

1. A method of processing a set of previously encoded image data comprising luminance data and chrominance data corresponding to the same portion of an image, the luminance data having been previously encoded at a first resolution and the chrominance data having been previously encoded at a second resolution which is lower than the first resolution, the method comprising the steps of:

performing a data reduction operation on the set of previously encoded chrominance and luminance data, the data reduction operation including the step of performing a data reduction operation on at least the previously encoded chrominance data at a rate which is greater than any rate at which data reduction is performed on the previously encoded luminance data, the data reduction operation producing a reduced set of chrominance and luminance data; and storing the reduced set of chrominance and luminance data in a data storage device.

2. The method of claim 1, wherein said data reduction operation performed on the set of previously encoded chrominance and luminance data involves performing data reduction on the previously encoded chrominance data but no data reduction on the previously encoded luminance data.

3. The method of claim 2, further comprising the step of:

using the stored reduced set of chrominance and luminance data as anchor frame data when performing a motion compensated prediction operation.

4. The method of claim 1, further comprising the steps of:

receiving encoded luminance and chrominance data; and performing a decoding operation to generate said set of previously encoded chrominance and luminance data.

5. The method of claim 4, wherein the received encoded luminance and chrominance data are encoded MPEG-2 P-frame data.

6. The method of claim 5, further comprising the steps of:

performing a first drift reduction filtering operation on the predicted chrominance data; and performing a second drift reduction filtering operation on the predicted luminance data, the second drift reduction filtering operation being more computationally complex than the first drift reduction filtering operation.

7. The method of claim 6, wherein the step of performing a first drift reduction filtering operation includes the step of using a first filter with a first number of stages; and wherein the step of performing a second drift reduction filtering operation includes the step of using a second drift reduction filter including more stages than the first drift reduction filter.

8. The method of claim 6, wherein the first drift reduction filtering operation includes the step of maintaining a first level of arithmetic precision; and wherein the second drift reduction filtering operation includes the step of maintaining a second level of arithmetic precision which is more accurate than the first level of arithmetic precision.

9. The method of claim 4, wherein the received encoded luminance and chrominance data are encoded MPEG-2 B-frame data.

10. The method of claim 4, wherein the received encoded luminance and chrominance data are encoded MPEG-2 I-frame data.

11. The method of claim 10, wherein the step of scaling the reduced set of chrominance data includes the step of:

performing an upsampling operation on the stored chrominance data.

12. The method of claim 4, wherein the step of performing a data reduction operation on the previously encoded chrominance data includes the step of downsampling the previously encoded chrominance data so that the reduced set of chrominance and luminance data includes chrominance data which is stored at a resolution which is lower than one half the resolution of the luminance data included in the reduced set of chrominance and luminance data.

13. The method of claim 1, further comprising the steps of:

receiving encoded MPEG-2 compliant chrominance and luminance data; and performing a decoding operation on the encoded MPEG-2 compliant chrominance and luminance data to generate said previously encoded chrominance and luminance data, the previously encoded chrominance and luminance data being decoded chrominance and luminance data.

14. The method of claim 1, wherein the step of performing a data reduction operation includes the step of:

performing a luminance data reduction operation on the previously encoded luminance data prior to storage.

15. The method of claim 14, wherein the luminance data reduction operation includes a downsampling operation involving the downsampling of the previously encoded luminance data at a lower rate than a rate at which chrominance data is downsampled as part of the chrominance data reduction operation.

16. The method of processing video data of claim 1, further comprising the steps of:

performing a motion compensated prediction operation using the stored reduced set of chrominance and luminance data as reference data to generate a set of predicted luminance and chrominance data therefrom.

17. The method of claim 16, wherein the step of performing a motion compensated prediction operation includes the step of:
scaling the reduced set of chrominance data to produce a set of scaled chrominance data; and
using the scaled set of chrominance data to perform the motion compensated prediction operation.

18. An apparatus for processing a set of previously predictively encoded chrominance and luminance data representing an image, the apparatus comprising:
a data reduction circuit for performing a data reduction operation on the set of previously predictively encoded chrominance and luminance data, the data reduction circuit including means for performing a data reduction operation on the previously predictively encoded chrominance data at a rate that is greater than the rate, if any, the data reduction circuit performs data reduction on previously predictively coded luminance data representing the image, the data reduction circuit operating to generate a reduced set of chrominance and luminance data; and
a storage device for storing the reduced set of chrominance and luminance data.

19. The apparatus of claim 18, further comprising:
means for receiving and decoding predictively coded image data to generate said previously predictively coded image data, coupled to said data reduction circuit.

20. The apparatus of claim 19, wherein the data reduction circuit is a downsampling circuit.

21. The apparatus of claim 19, further comprising:
a prediction circuit for performing a prediction operation using the reduced set of chrominance and luminance data.

22. An apparatus for processing previously encoded chrominance and luminance data representing a portion of an image which was predictively coded, the apparatus comprising:
a controllable data reduction circuit for performing data reduction operations, at different rates, on received decoded luminance data and decoded chrominance data, respectively.

23. The apparatus of claim 22, wherein the controllable data reduction circuit generates a reduced set of chrominance and luminance data, the apparatus further comprising:
a prediction circuit for performing a prediction operation using the reduced set of chrominance and luminance data.

24. The apparatus of claim 23, wherein the prediction circuit includes a scaling circuit for scaling chrominance data included in the reduced set of luminance and chrominance data.

25. The apparatus of claim 23, further comprising:
decoder circuitry for generating the decoded chrominance and luminance data from a set of encoded MPEG-2 compliant image data.

26. A method of processing decoded predicted luminance and chrominance data generated by performing a motion compensated prediction operation, comprising the steps of:
performing a first drift reduction processing operation on the decoded predicted chrominance data; and
performing a second drift reduction processing operation on the decoded predicted luminance data, the second drift reduction processing operation being more computationally complex than the first drift reduction processing operation.

27. The method of claim 26,
wherein the first and second filtering operations are motion compensated prediction drift reduction filtering operations; and
wherein the per unit basis is a per block basis.

28. A method of processing predicted luminance and chrominance data generated by performing a motion compensated prediction operation, comprising the steps of:
performing a first image enhancement operation on the predicted chrominance data; and
performing a second image enhancement operation on the predicted luminance data, the second image enhancement operation being more computationally complex than the first image enhancement operation;
wherein the first image enhancement operation is a first drift reduction filtering operation which includes the step of using a first filter with a first number of stages; and
wherein the second image enhancement operation is a second drift reduction filtering operation which includes the step of using a second drift reduction filter including more stages than the first drift reduction filter.

29. A method of processing predicted luminance and chrominance data generated by performing a motion compensated prediction operation, comprising the steps of:
performing a first image enhancement operation on the predicted chrominance data; and
performing a second image enhancement operation on the predicted luminance data, the second image enhancement operation being more computationally complex than the first image enhancement operation;
wherein the first image enhancement operation is a first drift reduction filtering operation which includes the step of maintaining a first level of arithmetic precision; and
wherein the second image enhancement operation is a second drift reduction filtering operation which includes the step of maintaining a second level of arithmetic precision which is more accurate than the first level of arithmetic precision.

30. A video processing method comprising the steps of:
performing a motion compensated prediction operation to generate a set of decoded image data including decoded luminance image data and decoded chrominance image data;
performing a first drift reduction filtering operation on the decoded chrominance image data; and
performing a second drift reduction filtering operation on the decoded luminance image data, the second drift reduction filtering operation being a more computationally complex drift reduction filtering operation than the first drift reduction operation.

31. The method of claim 30,
wherein the first drift reduction filtering operation includes the step of using an M order filter, where M is a positive integer; and
wherein the second drift reduction filtering operation includes the step of using an N order filter, wherein N is a positive integer which is greater than M.

32. The method of claim 30,
wherein the first drift reduction filtering operation includes the step of maintaining a first level of arithmetic precision; and wherein the second drift reduction filtering operation includes the step of maintaining a second level of arithmetic precision which is more accurate than the first level of arithmetic precision.

33. The video processing method of claim 30, further comprising the step of:

generating and displaying a first image using the filtered chrominance and luminance image data;

decoding additional image data representing an intra-coded image to produce decoded intra-coded image data; and generating and displaying a second image using the decoded intra-coded image data.

34. A method of performing a filtering operation on luminance image data and chrominance image data, the method comprising the steps of:

dynamically varying the computational complexity of a filter used to filter the image data as a function of whether the image data to be filtered is luminance or chrominance image data; and filtering the image data using the filter.

35. The method of claim 34, wherein the filtering operation is a drift reduction filtering operation; and wherein the step of dynamically varying the computational complexity of a filter includes the step of:

altering the number of stages included in the filter.

36. The method of claim 34, wherein the step of dynamically varying the computational complexity of a filter includes the step of:

changing the order of the filter so that the filter operates as a filter of a first order when processing chrominance data and a second order when processing luminance data, the second order being higher than the first order.

37. The method of claim 34, further comprising the step of:

determining whether luminance or chrominance image data is being processed; and wherein the step of dynamically varying the computational complexity of a filter involves the step of:

i. modifying the filter to perform a first filtering operation on chrominance image data, and ii. modifying the filter to perform a second filtering operation on the luminance image data, the second filtering operation involving more mathematical operations on a per unit basis of processed image data than the first filtering operation.

\* \* \* \* \*